F. S. MAYNARD.
CLUTCH CONTROL FOR AUTOMOBILES.
APPLICATION FILED SEPT. 25, 1919.

1,390,148.

Patented Sept. 6, 1921.

Haye S. Maynard, Inventor

By E. Hume Talbott

Attorney

F. S. MAYNARD.
CLUTCH CONTROL FOR AUTOMOBILES.
APPLICATION FILED SEPT. 25, 1919.
1,390,148.
Patented Sept. 6, 1921.
3 SHEETS—SHEET 2.
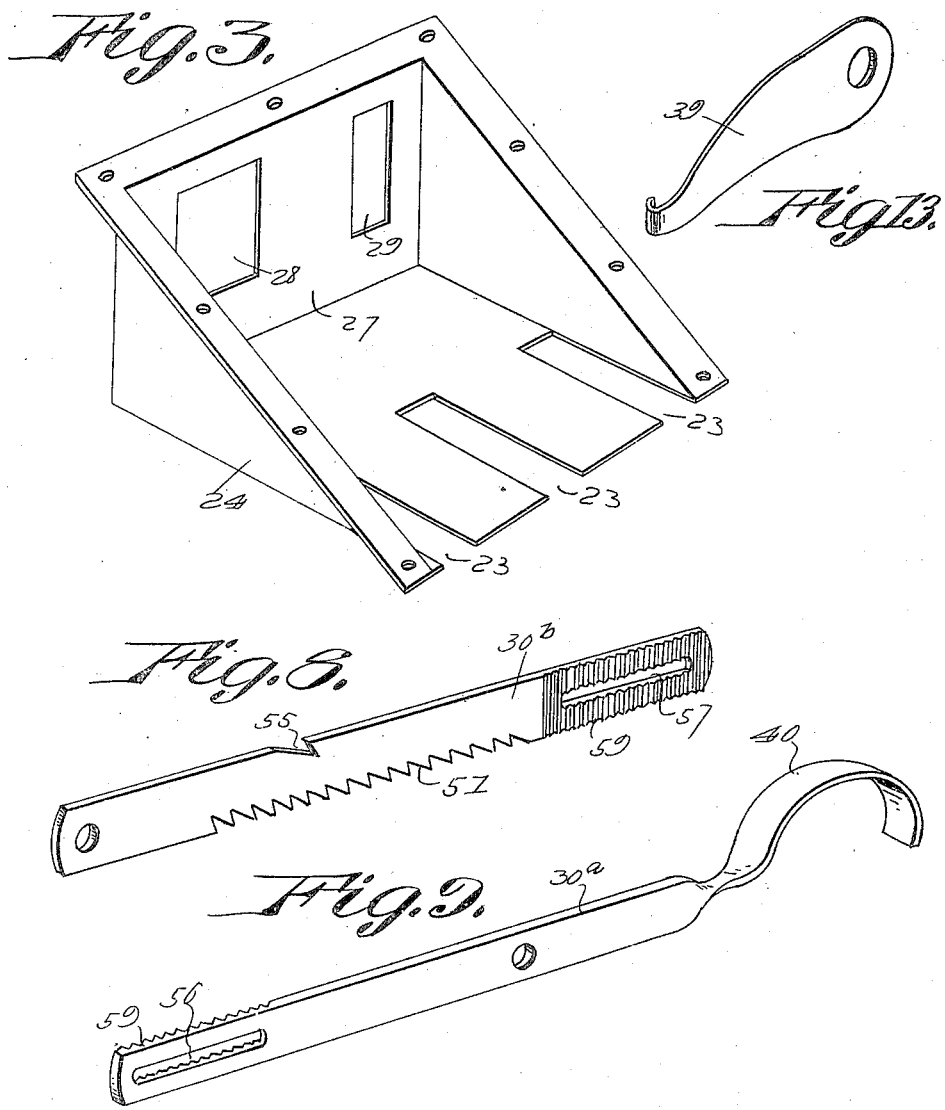
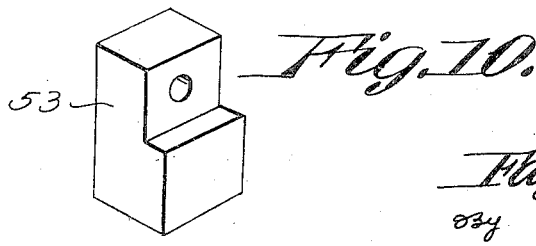

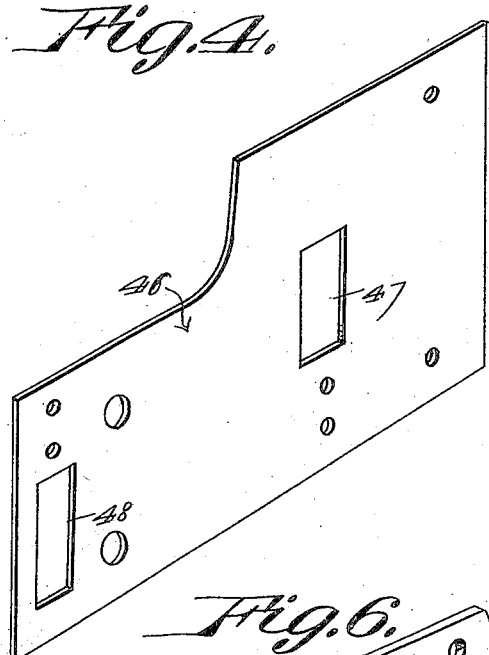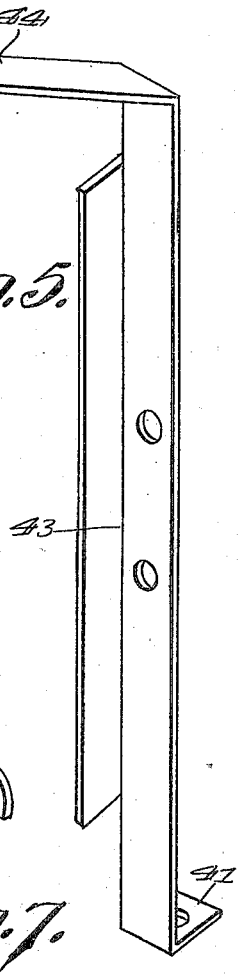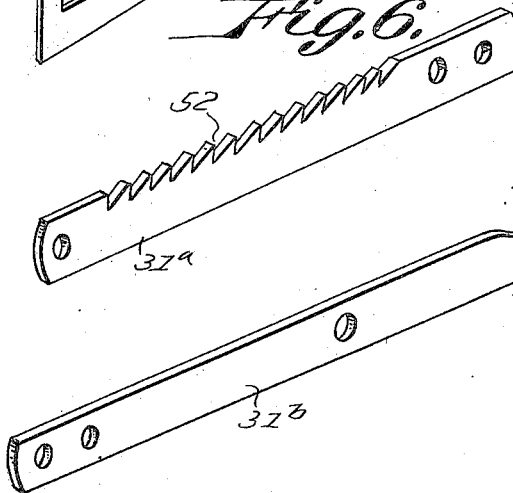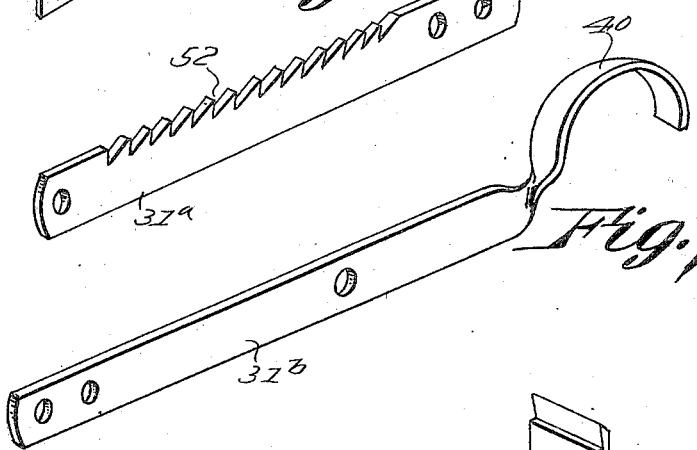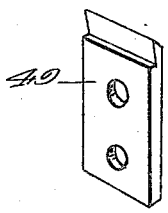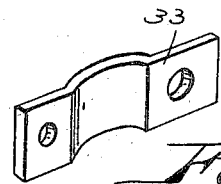

UNITED STATES PATENT OFFICE.

FAYE S. MAYNARD, OF ARARAT, PENNSYLVANIA.

CLUTCH CONTROL FOR AUTOMOBILES.

1,390,148.  Specification of Letters Patent.  Patented Sept. 6, 1921.

Application filed September 25, 1919. Serial No. 326,147.

*To all whom it may concern:*

Be it known that I, FAYE S. MAYNARD, a citizen of the United States of America, residing at Ararat, in the county of Susquehanna and State of Pennsylvania, have invented new and useful Improvements in Clutch Controls for Automobiles, of which the following is a specification.

The object of the invention is to provide a relatively simple and efficient means for controlling the clutch and brake pedals of automobiles of the Ford type so as to lock the clutch pedal either in neutral or low speed positions and the brake pedal in release position while providing for the disengagement of the locking means with facility and without special effort upon the part of the operator, to the end that the operation of a car, particularly in ascending grades, or when traveling at slow speed may require the minimum of attention upon the part of the operator.

With these and related objects in view as will appear in the course of the following description of a preferred embodiment of the invention, the same consists in a construction and combination of parts applicable to cars of the type indicated, it being understood that changes in form, proportion and details, in adapting the same to any peculiarities of special constructions of car may be resorted to, within the scope of the appended claims without departing from the principles involved.

In the drawing:

Fig. 3 is a perspective view of a guard plate adapted to be substituted for a section of the automobile footboard which is removed in order to apply the attachment.

Fig. 4 is a similar view of a dog-supporting plate having guide openings for the latch bars.

Fig. 5 is a similar view of a bracket by which the attachment is anchored to the engine.

Figs. 6 and 7 are detail views detached of members of the brake pedal latch bar.

Figs. 8 and 9 are similar views of the members detached of the clutch pedal latch bar.

Fig. 10 is a detail view of one of the latch bar weights.

Fig. 11 is a view of one of the latch bar dogs.

Fig. 12 is a view of one of the clamp members by which the mounting of the latch bars upon the pedal arms is secured.

Fig. 13 is a similar view of one of the latch holding springs.

Figure 1:
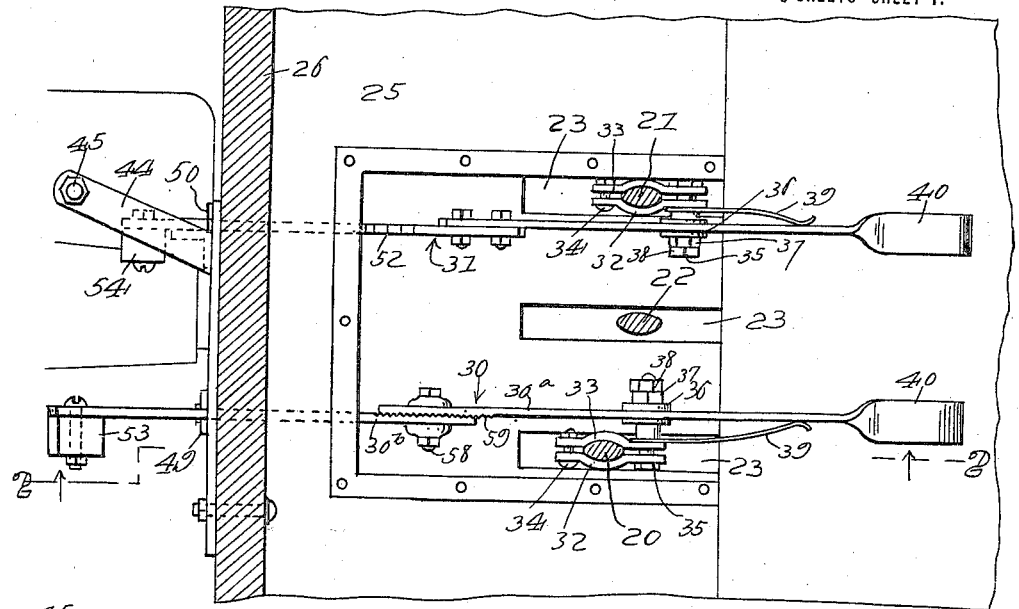
Figure 1 is a plan view.
Figure 2:
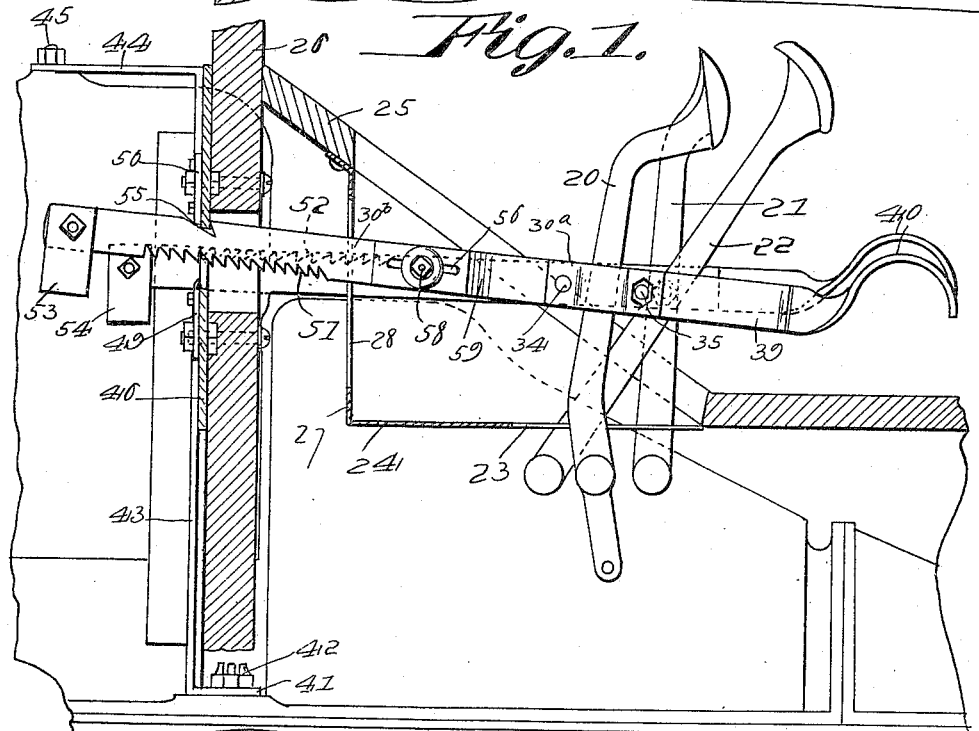
Fig. 2 is a sectional view on the plane indicated by the line 2—2 of Fig. 1.

The clutch and brake pedals are shown respectively at 20 and 21, the reverse pedal 22 being arranged as usual for operation in a plane therebetween in slots 23 formed in a guard plate or pan 24 which is inserted in an opening formed by cutting away a portion of the footboard 25 of the automobile floor adjacent to the dash-board 26, said pan also having a front wall 27 as shown clearly in Fig. 3 provided with openings 28 and 29 through which extend latch bars 30 and 31 pivotally mounted respectively upon said clutch and brake pedals.

The mounting of the latch bars upon said pedals is preferably effected by employing clamps having the complemental members 32 and 33 secured together in clamping relation with the shank of the pedal by bolts 34 and 35 of which the latter is extended to form a journal for the latch bar and should be provided with washers 36 and main and locking nuts 37 and 38. Also in connection with each latch bar there is preferably provided a laterally bearing spring 39 for preventing looseness of movement or rattling, the rear extremity of the body portion of the latch bar having a heel bearing 40 arranged in position to be engaged by the heel of the foot of the operator which is disposed to actuate the corresponding pedal to the end that by a simple rocking movement of the foot which is positioned to actuate said pedal it is possible to depress the end of the latch bar.

Mounted in rear of the dash-board with its lower angular end 41 secured by a bolt 42 to the transmission casing is a bracket bar 43 of which the upper end is provided with an arm 44 bolted as at 45 to the engine head, and secured to this bracket bar is a guide plate 46 having guide openings 47 and 48 through which extend the latch bars 30 and 31 while adjacent to said guide openings and secured to the guide plate are the dogs 49 and 50 for engagement with the ratchets 51 and 52 carried by said latch bars, the latch bar 30 being adapted for downward engagement, the teeth 51 thereof being arranged at its lower edge while the latch bar 31 is adapted for upward engagement, the ratchet teeth thereof being provided at its upper edge. Counterbalancing weights 53 and 54 are provided at the rear ends of said latch bars to normally hold the ratchet toothed extremities thereof in a depressed position.

From the foregoing description it will be seen that when the clutch pedal is advanced to low speed as in the ordinary operation of devices of this type it will be locked against movement in the opposite direction or movement toward the high-speed position by the engagement of the ratchet 51 with the dog 49, a weight 53 serving to cause such engagement, whereas to release said pedal to permit of its movement in the opposite direction or toward the high-speed position, it is merely necessary to trip the latch bar by a slight downward pressure of the heel of the operator's foot upon the heel bearing 40 at the rear end of the latch bar. On the other hand if it is desired to lock the brake pedal in its released position the operator after advancing the pedal to the desired position presses downward upon the bearing surface 40 of the latch bar 31 to lift the opposite end of the latch bar to cause the engagement of the ratchet teeth 52 with the dog 50. In order to release the brake pedal it is only necessary therefore to advance said brake pedal slightly in order to permit the weight 54 to disengage the ratchet teeth 52 from the dog 50.

In order that the apparatus may be applied to machines wherein there may be slight variations in dimensions, the latch bars may be of extensible construction as indicated with reference to the member mounted upon the clutch pedal, and in this connection it is desirable to provide for adjustment in order that a locking notch 55 thereof may engage the guide plate 46 when the clutch pedal is in neutral position, said engagement being effected by an upward movement of the forward end of said latch bar caused by a depression of the rear end thereof by the heel of the foot of the operator positioned upon the clutch pedal. Such adjustment of the length of the latch bar is effected in the construction illustrated by forming the same of relatively adjustable sections 30ª and 30ᵇ slotted for registration as at 56 and 57 for engagement by a transverse bolt 58. The contacting faces of said sections are preferably serrated as shown at 59.

Owing to the fact that the engagement or disengagement of the latch bars to hold or release the pedals upon which they are mounted may be effected by a mere rocking movement from a very short distance of the foot by which the pedal itself is being operated, it is obvious that little attention in that connection and practically no effort upon the part of the operator, is required, whereas it is possible to secure the clutch pedal either in neutral position or in low, at any preferred adjustment of speed and withdraw the foot from the pedal as when ascending long grades as a means of reducing the effort of the operator and avoiding the necessity of keeping the foot in a more or less cramped position in order that the speed while progressing on the grade may be maintained at a uniform rate. In the same way the brake pedal may be locked in the release position at the same time and yet it is adapted to be momentarily released merely by placing the foot upon the pedal in such a position as to cause the forward movement of the pedal sufficient to permit the counterbalancing weight to act and return the latch bar to its normal position. It will be understood that with reference to the brake pedal an affirmative action on the part of the operator is necessary to cause the engagement of the latch bar, as it is is in regard to the clutch pedal when it is desired to secure the latter in neutral position, whereas with reference to the clutch pedal an affirmative action is required to release the same when it has been left in low speed position, the engagement of the latch bar in the latter instance being automatic to hold the clutch pedal in its repressed or low speed position.

What is claimed is:

1. A locking device for the clutch pedal of an automobile having a latch bar pivotally mounted at an intermediate point upon said pedal and provided at one end with a heel plate within reach of the foot positioned on the pedal, said latch bar having ratchet teeth at its lower edge and a notch at its upper edge, and detents for engagement respectively by said teeth and said notch for the purpose specified.

2. A locking device for the clutch pedal of an automobile having a latch bar pivotally mounted at an intermediate point upon said pedal and provided at one end with a heel plate within reach of a foot positioned upon the pedal, said latch bar being of extensible construction and counter-weighted for depression at the end opposite to said heel plate, and having at its lower edge ratchet teeth and at its upper edge a notch, and detents for engagement respectively by said ratchet teeth and neutral notch.

3. A locking device for an automobile pedal having a latch bar pivotally mounted at an intermediate point upon said pedal and provided at one end with a heel plate within reach of a foot positioned upon the pedal, said lever being yieldingly held in one position and provided with ratchet teeth, a detent for engagement by said ratchet teeth to lock the pedal in an adjusted position and a laterally bearing spring carried by the pedal for contact with said latch bar.

In testimony whereof I affix my signature.

FAYE S. MAYNARD.